(12) United States Patent
Duale et al.

(10) Patent No.: US 11,561,105 B2
(45) Date of Patent: Jan. 24, 2023

(54) OPTIMIZED ROUTE PLANNING FOR MULTIPLE TRAVELERS WITH THE SAME DESTINATION

(71) Applicant: INTERNATIONAL BUSINESS MACHINES CORPORATION, Armonk, NY (US)

(72) Inventors: Ali Y. Duale, Poughkeepsie, NY (US); Shailesh R. Gami, Poughkeepsie, NY (US); Arkadiy O. Tsfasman, Wappingers Falls, NY (US); John S. Werner, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 15/825,485

(22) Filed: Nov. 29, 2017

(65) Prior Publication Data

US 2019/0162546 A1    May 30, 2019

(51) Int. Cl.
*G01C 21/34* (2006.01)
*G06Q 50/30* (2012.01)

(52) U.S. Cl.
CPC ..... *G01C 21/3438* (2013.01); *G01C 21/3469* (2013.01); *G06Q 50/30* (2013.01)

(58) Field of Classification Search
CPC .... G06Q 50/30; G01C 21/34; G01C 21/3438; G01C 21/3469
See application file for complete search history.

(56) References Cited

U.S. PATENT DOCUMENTS 9,261,374 B2    2/2016  Mundinger et al.
2008/0114840 A1*  5/2008  Rollin .................... G06Q 10/02
                                                 709/206

(Continued)

FOREIGN PATENT DOCUMENTS

KR       20170016737      *   2/2017

OTHER PUBLICATIONS

"Minimizing CO2 emissions in a practical daily carpooling problem", Bruck et al., Dec. 8, 2016, Computers and Operations Research at Science Direct (Year: 2016).*

(Continued)

*Primary Examiner* — Jeffrey C Boomer
*Assistant Examiner* — Annmarie Dressler
(74) *Attorney, Agent, or Firm* — Cantor Colburn LLP; Teddi Maranzano

(57) ABSTRACT

Technical solutions are described for determining a route for multiple users traveling to a common destination. An example method includes determining, by a multiuser route generator, a multiuser route for a plurality of users traveling to the common destination, the multiuser route comprising a waypoint, the waypoint being a location to which each of the plurality of users travel independently, and travel to the common destination jointly thereafter. Determining the multiuser route includes receiving departure locations of the users, determining the waypoint, and calculating a first total of travel parameters associated with the users traveling to the waypoint independently and jointly thereafter that is lesser than a second total of travel parameters associated with the users traveling to the common destination independently. The method further includes sending the multiuser route to navigation devices of the respective users, the navigation devices navigating the respective users along the multiuser route.

7 Claims, 8 Drawing Sheets

(56) References Cited

U.S. PATENT DOCUMENTS

| | | |
|---|---|---|
| 2011/0113148 A1 | 5/2011 | Salmela et al. |
| 2011/0137691 A1 | 6/2011 | Johnson |
| 2012/0059679 A1 | 5/2012 | De Marcken et al. |
| 2013/0054281 A1* | 2/2013 | Thakkar ................. G06Q 50/30 705/5 |
| 2014/0222328 A1* | 8/2014 | Baca ................... G01C 21/3438 701/410 |
| 2017/0267233 A1* | 9/2017 | Minster .................. B62D 15/02 |
| 2018/0023967 A1* | 1/2018 | Mazzella et al. .. G01C 21/3438 701/411 |
| 2019/0033084 A1* | 1/2019 | Chen .................. G01C 21/3438 |

OTHER PUBLICATIONS

Minimizing C02 emissions in a practical daily carpooling problem, Bruck et al., Dec. 8, 2016, Computers and Operations Research at Science Direct (Year: 2016).*

* cited by examiner

OPTIMIZED ROUTE PLANNING FOR MULTIPLE TRAVELERS WITH THE SAME DESTINATION

BACKGROUND

The present invention generally relates to navigation systems, and particularly to route planning in travel and transport (logistics) to provide an optimized route planning for multiple travelers with the same destination.

Route planning requires finding an ideal route from a departure point to a destination point. In a navigation system like a car navigation apparatus, a smartphone, or any other device used for navigation, the process for navigating a user is performed by searching for an appropriate route to travel from the departure point to the destination point and displaying a result of the search on a display screen. In one or more examples, the navigation system navigates the user by providing audio-visual cues for following the route that has been identified.

SUMMARY

Technical solutions are described for determining a route for multiple users traveling to a common destination. An example method includes determining, by a multiuser route generator, a multiuser route for two or more users traveling to the common destination, the multiuser route includes a waypoint, the waypoint being a location to which each of the two or more users travel independently, and travel to the common destination jointly thereafter. Determining the multiuser route includes receiving departure locations of the users, determining the waypoint, and calculating a first total of travel parameters associated with the users traveling to the waypoint independently and jointly thereafter that is lesser than a second total of travel parameters associated with the users traveling to the common destination independently. The method further includes sending the multiuser route to navigation devices of the respective users, the navigation devices navigating the respective users along the multiuser route.

According to one or more embodiments, a system includes a multiuser route generator that determines a route for multiple users traveling to a common destination, where the multiuser route generator performs determining a multiuser route for two or more users traveling to the common destination, the multiuser route includes a waypoint, the waypoint being a location to which each of the two or more users travel independently, and travel to the common destination jointly thereafter. Determining the multiuser route includes receiving departure locations of the users, determining the waypoint, and calculating a first total of travel parameters associated with the users traveling to the waypoint independently and jointly thereafter that is lesser than a second total of travel parameters associated with the users traveling to the common destination independently. The method further includes sending the multiuser route to navigation devices of the respective users, the navigation devices navigating the respective users along the multiuser route.

According to one or more embodiments, a computer program product includes a computer readable storage medium having program instructions embodied therewith, the program instructions executable by a processing circuit to cause the processing circuit to determine a route for multiple users traveling to a common destination. The route determination includes determining a multiuser route for two or more users traveling to the common destination, the multiuser route includes a waypoint, the waypoint being a location to which each of the two or more users travel independently, and travel to the common destination jointly thereafter. Determining the multiuser route includes receiving departure locations of the users, determining the waypoint, and calculating a first total of travel parameters associated with the users traveling to the waypoint independently and jointly thereafter that is lesser than a second total of travel parameters associated with the users traveling to the common destination independently. The method further includes sending the multiuser route to navigation devices of the respective users, the navigation devices navigating the respective users along the multiuser route.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Figure 1:
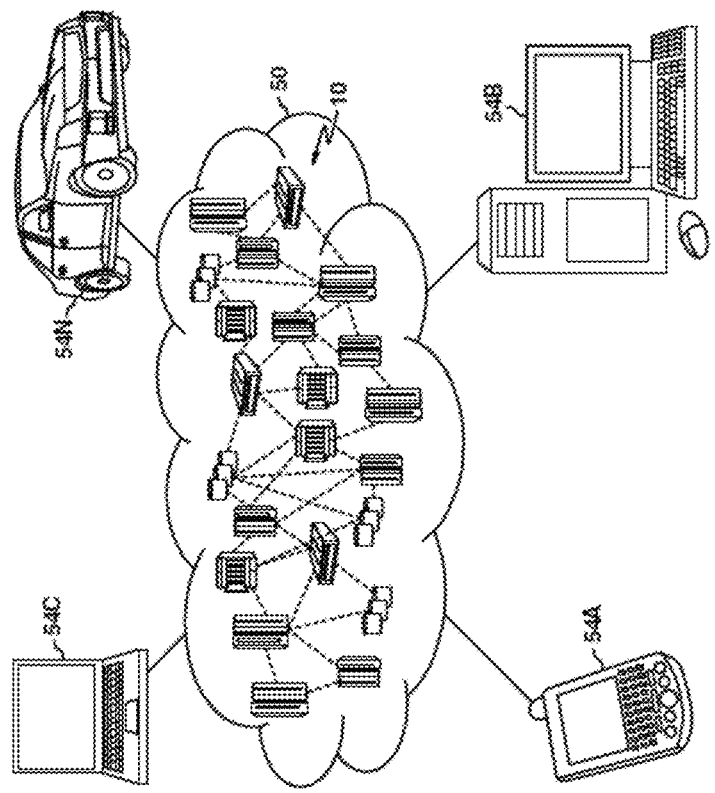
FIG. 1 depicts a cloud computing environment according to an embodiment of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Typically, a navigation system provides route planning for a single user. For example, the navigation system determines one or more routes for the user to travel from a departure point to a destination point and navigates the user along one of the routes that are selected by the user. However, a technical challenge exists, that a typical navigation system fails to address: providing a route for multiple travelers that are located at different departure points, and who want to reach the same destination. The technical solutions described herein address this technical challenge.

Further, a technical challenge exists for planning a route for the multiple users headed to the same destination if the travelers plan to meet prior to reaching the destination to carpool and maximize a total miles saved. The technical solutions described herein address this technical challenge by determining and providing routes to the multiple users so that the users can meet at one or more waypoints prior to the destination and travel together to the destination. The technical solutions thus reduce the total number of miles traveled by the multiple users and further facilitate reducing and saving costs of fuel usage, parking, pollution, and the like. The technical challenge, in other words is that of finding an optimal meeting point (waypoint) between two or more users traveling to the same destination, such that the waypoint serves as a place to meet and allow the users to leave one or more vehicles at the waypoint and use a single vehicle to travel to the destination. The users may want to find the waypoint such that they can leave one or more of their vehicles, but not know if that is the optimal place to meet such that overall mileage between all the users is minimized.

The technical solutions described herein address the technical challenge by determining one or more waypoints for the multiple users. As is described in detail herein, the technical solutions facilitate determining and providing the multiple users a multi-route that leads to the destination and minimize overall mileage among all the users.

In one or more examples, the technical solutions described herein receive the starting point of each of the users, and the common destination for the users as input. The technical solutions facilitate outputting an optimal route for each of the users and waypoints for each of the users such that total mileage between all users is minimized, thus minimizing traveling costs, pollution, and other such factors. The technical solutions described herein further facilitate navigating the users along the multiple routes determined. In one or more examples, the technical solutions described herein facilitate one or more users to change their departure points and in response, adjust the waypoint(s) determined. Further, the technical solutions described herein facilitate scheduling departure times for the multiple users to enable the users to have concurrent estimated arrival times at the waypoints. The technical solutions described herein further facilitate the one or more users to populate a predetermined list of waypoints to select from, the predetermined waypoints being places that allow the users to leave parked vehicles. These, as well as additional features and advantages of the technical solutions, are described in further detail using one or more embodiments. It should be noted that the embodiments described herein are examples and that the technical solutions described herein may be implemented differently in other examples.

The technical solutions described herein may be implemented using cloud computing in one or more examples. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
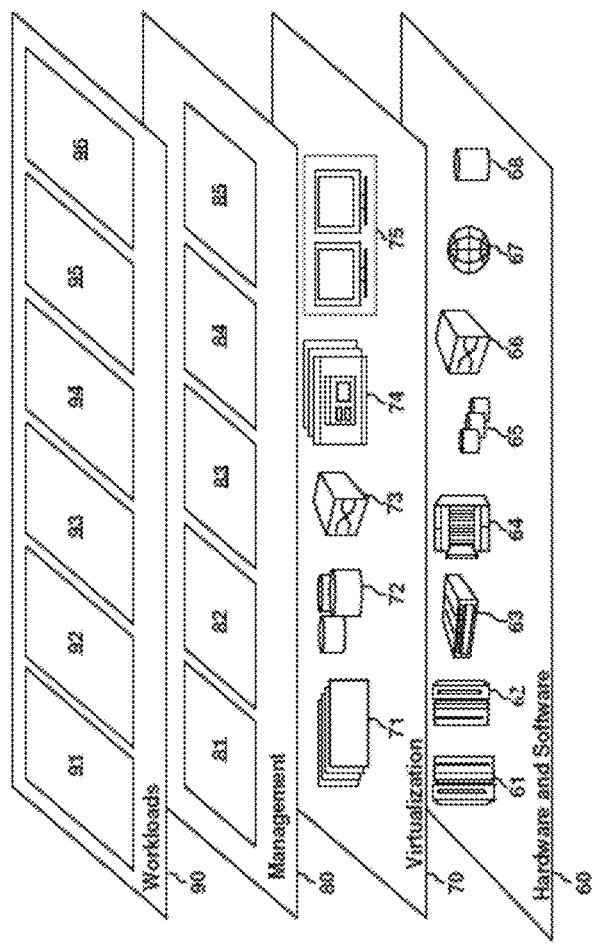
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and route planning 96.

Figure 3:
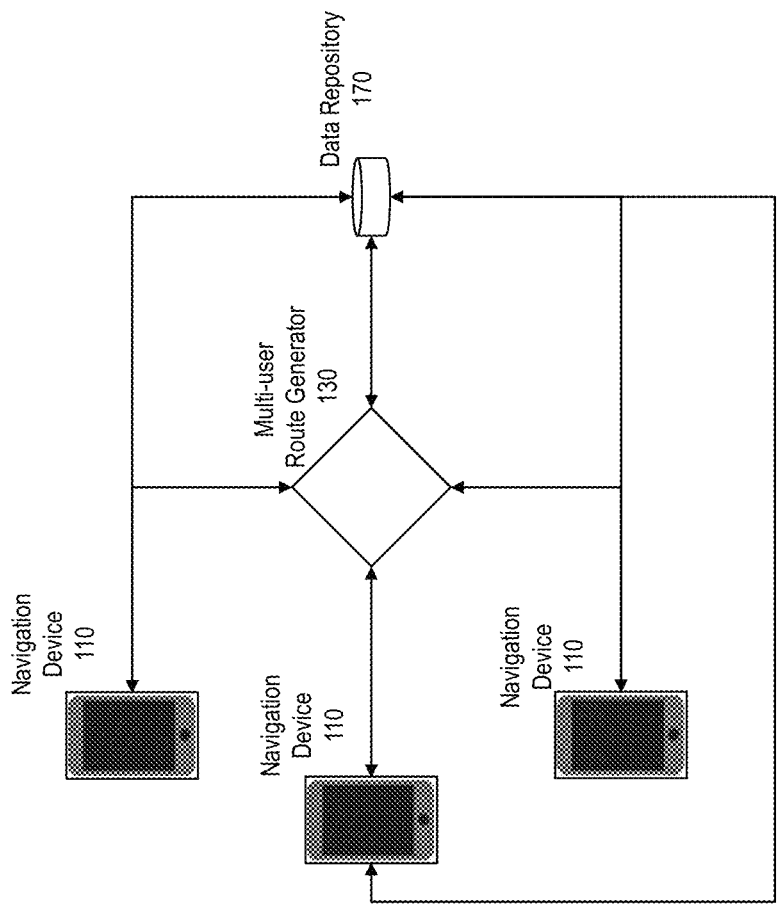
FIG. 3 depicts an example system for determining a multiuser navigation route according to one or more embodiments.

FIG. 3 depicts an example system 100 for route planning according to one or more embodiments of the present invention. The system 100 determines a multiuser navigation route according to the technical solutions described herein. The system includes, among other components, one or more navigation devices 110 associated with respective users, a multiuser route generator 130, and a data repository 170. It should be noted that in other examples, the number of navigation devices 110 used may be different than what is depicted in FIG. 3. It should be further noted that in the one or more embodiments described herein, a travel may concern persons (travelers) or objects, commonly referred to as users. A user can be an individual traveler, a group of travelers, a transport manager, a single package or other object, or group of packages or other objects moved for example in a factory, in a port, etc.

The data repository 170 stores navigation data that is used by the multiuser route generator 130 to determine routes between a departure point and a destination point. For example, the data repository 170 may be a map database, a geographic information system (GIS) database, or the like, that provides an application programming interface (API) to access data regarding roads and other transportation information to determine the routes. The multiuser route generator 130 may receive data such as streets, landmarks, distances, geographic coordinates, present traffic conditions, historic traffic conditions, future traffic conditions, and other such attributes from the data repository 170. Further, the data repository 170 may provide weather information. Further yet, the API of the data repository 170 may facilitate the multiuser route generator 130 to query the data available in the data repository using filters, such as for specific time intervals, for specific types of landmarks, or any other attributes associated with the stored data.

In one or more examples, the multiuser route generator 130 is a computer device that uses the data repository 170 to compute a multiuser route for the multiple users corresponding to the navigation devices 110 in response to receiving departure points for the navigation devices 110 and a common destination for the navigation devices 110. In one or more examples, the multiuser route generator 130 is an electronic circuit. Alternatively, or in addition, the multiuser route generator 130 includes computer executable instructions that are read and executed by a processing circuit. In one or more examples, the navigation devices 110 communicate with the multiuser route generator 130, for example via a communication network, such as the Internet, in a wired and/or a wireless manner. For example, the multiuser route generator 130 may be an application server that the navigation devices 110 communicate with. The application server may be a distributed computer server, such as a cloud computing platform providing the route planning service 96. In one or more examples, the multiuser route generator 130 may be part of one of the navigation devices 110 itself, for example instructions executed by the navigation device 110 (although the multiuser route generator 130 is depicted separately from the navigation devices 110 in FIG. 3).

The navigation devices 110 communicate with the multiuser route generator 130 to provide input data, such as departure points, destination, waypoint(s), present location, image(s), or other such data or a combination thereof. The navigation devices 110 may provide the input data via a user-interface. Alternatively, or in addition, the navigation devices 110 provide such input data to the multiuser route generator 130 in response to request(s) received from the multiuser route generator 130. In one or more examples, one or more components of the navigation devices 110, such as GPS, camera, microphone, and the like may be controllable via one or more commands by the multiuser route generator 130.

The multiuser route generator 130, in response to receiving the input data from the navigation devices 110, generates the multiuser route. The multiuser route includes multiple route segments, at least one route segment for each navigation device 110. Further, the multiuser route includes at least one waypoint, where the waypoint is a location to which two or more of the multiple users travel individually, meet, then travel to the common destination together from thereon. The waypoint is a location where at least one of the users parks a vehicle, and is hence, in the data repository, associated with attributes that identify the location as a potential waypoint. For example, the attributes may include a parking lot, mall, shopping center, or the like, identifying the location to facilitate parking one or more vehicles for at least a predetermined duration. Alternatively, or in addition, the waypoint may be a home of one of the multiple users.

In one or more examples, the waypoints may be marked with an indicator, such as tags, like 'waypoint' or any other indicator in the data repository 170. In one or more examples, the system facilitates live user updates in which the one or more users add/subtract waypoints such that the system continually remains current. The users of the navigation devices 110 may mark one or more locations as potential waypoints via the navigation devices 110. For example, a user, when at the location of a waypoint, may tag the present location of the navigation device, by communicating with the data repository 170. The present location of the navigation device may be determined using a GPS included in the navigation device, or manually entering the coordinates. Alternatively, or in addition, the user, via the navigation device 110, may mark the location as the waypoint via an interactive map, for example by clicking, double-clicking, right-clicking, selecting an option from a menu, or any other user-interactive action on the interactive map.

The waypoint(s) that is selected for the multiuser route optimizes the routes that the respective users may take to reach the common destination separately. In one or more examples, the multiuser route generator selects the waypoint(s) to reduce the total distance. For example, the waypoints are selected such that a distance ($D_{MU}$) traveled by the users using the multiuser route with the waypoint is less than the sum of distances ($D_T$) traveled by the users independently to the destination.

The multiuser route may further include a scheduled time to leave for each user based on traffic and weather conditions, including present traffic conditions and/or historic traffic conditions so that the users reach the waypoint substantially concurrently. Alternatively, or in addition, the scheduled time to leave for a user may be updated based on the progress of other users on the multiuser route such that the users reach the waypoints substantially together. The update may include changing the waypoint if one or more of the users are delayed. The progress of the other users is monitored by the multiuser route generator 130 using the GPS of the navigation devices 110 of the respective users.

The navigation devices 110, in response to providing the input data, receive the multiuser route from the multiuser route generator 130. The one or more users may interact with the multiuser route and change one or more attributes of the route. For example, the users may enter additional waypoint(s), causing the multiuser route generator 130 to determine an updated multiuser route. Alternatively, or in addition, the users may change the departure points, departure times, the common destination, or the like, causing the multiuser route to be updated further. In one or more examples, the multiuser route generator 130 shows present location of the users on the map and estimated times of arrival to the waypoint for each of the users.

The navigation devices 110 further navigate the users to the waypoints using audio-visual cues, such as voice navigation, turn-by-turn navigation, displaying a marker for the navigation device 110 on a map, and any other audio-visual cues presently known or to be known.

The system 100 thus facilitates route planning for multiple users traveling to the same destination and determines the multiuser route, which includes one or more waypoints, to optimize at least one parameter, such as the total distance, for the multiple users traveling independently to the common destination.

Figure 4:
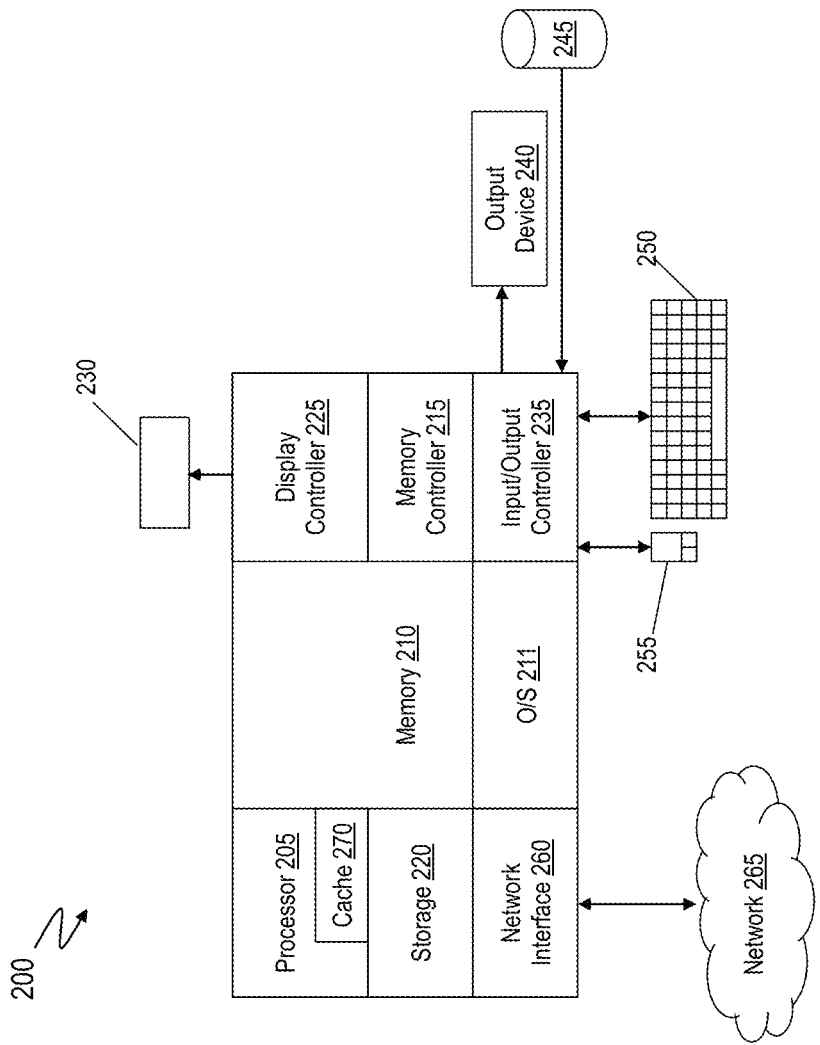
FIG. 4 illustrates an example system according to one or more embodiments.

FIG. 4 illustrates an example system 200 according to one or more embodiments. The system 200 may be a communication apparatus, such as a computer. For example, the system 200 may be a desktop computer, a tablet computer, a laptop computer, a phone, such as a smartphone, a server computer, or any other device that communicates via a network 265. The system 200 includes hardware, such as electronic circuitry. In one or more examples, the system 200 is any one or more of the devices depicted in FIG. 3, such as the navigation device 110, the multiuser route generator 130, and the data repository 170. The navigation device 110 may further be a navigation system that is installed in an automobile.

The system 200 includes, among other components, a processor 205, memory 210 coupled to a memory controller 215, and one or more input devices 245 and/or output devices 240, such as peripheral or control devices, which are communicatively coupled via a local I/O controller 235. These devices 240 and 245 may include, for example, battery sensors, position sensors, indicator/identification lights and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the system 200, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods described herein.

The system 200 may further include a display controller 225 coupled to a user interface or display 230. In some embodiments, the display 230 may be an LCD screen. In other embodiments, the display 230 may include a plurality of LED status lights. In some embodiments, the system 200 may further include a network interface 260 for coupling to a network 265. The network 265 may be an IP-based network for communication between the system 200 and an external server, client and the like via a broadband connection. In an embodiment, the network 265 may be a satellite network. The network 265 transmits and receives data between the system 200 and external systems. In some embodiments, the network 265 may be a managed IP network administered by a service provider. The network 265 may be implemented in a wireless fashion, for example, using wireless protocols and technologies, such as WiFi, WiMax, satellite, or any other. The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a virtual private network (VPN), intranet or other suitable network system and may include equipment for receiving and transmitting signals.

Figure 5:
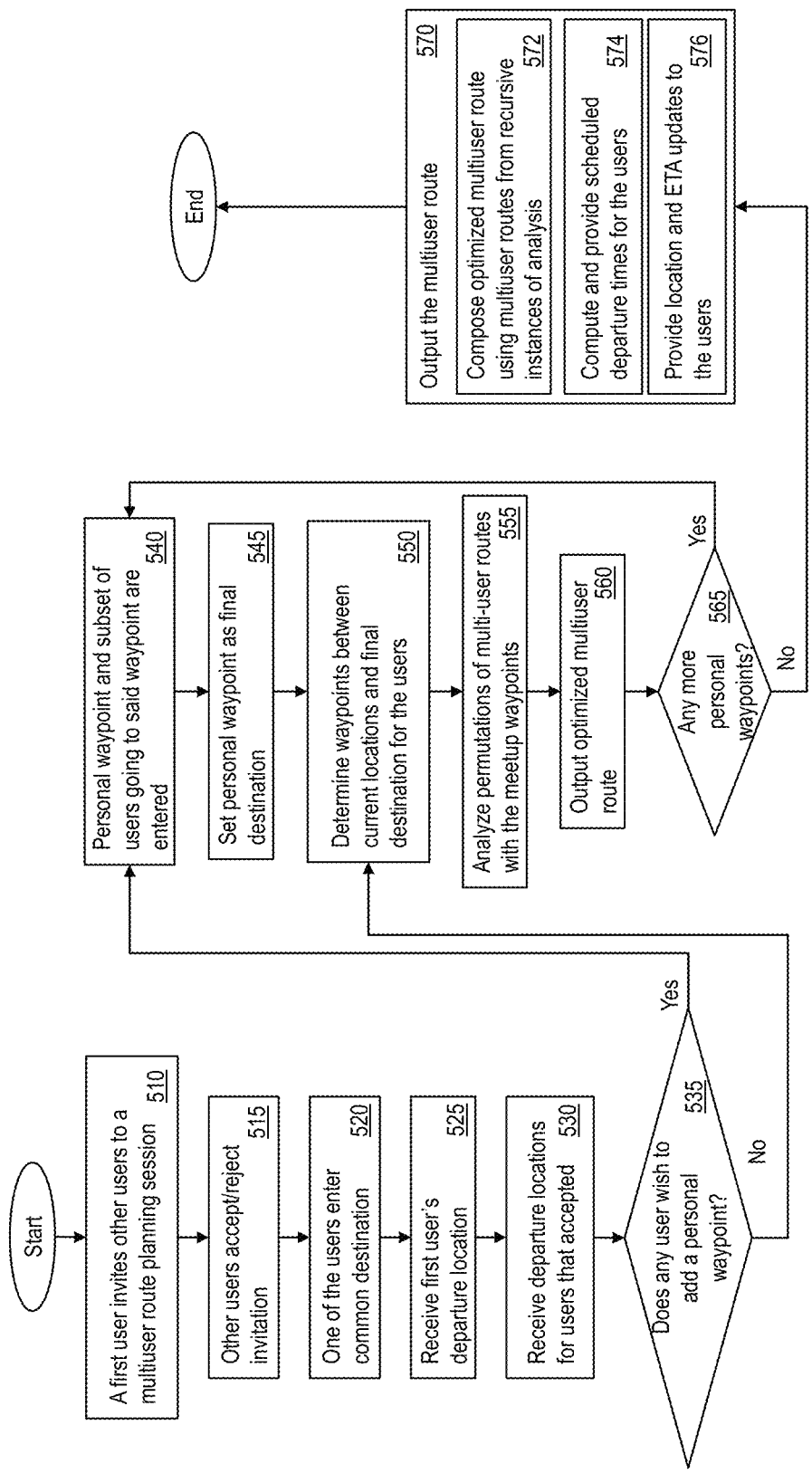
FIG. 5 depicts a flowchart of an example method for route planning for multiple users traveling to the same destination according to one or more embodiments.
Figure 6:
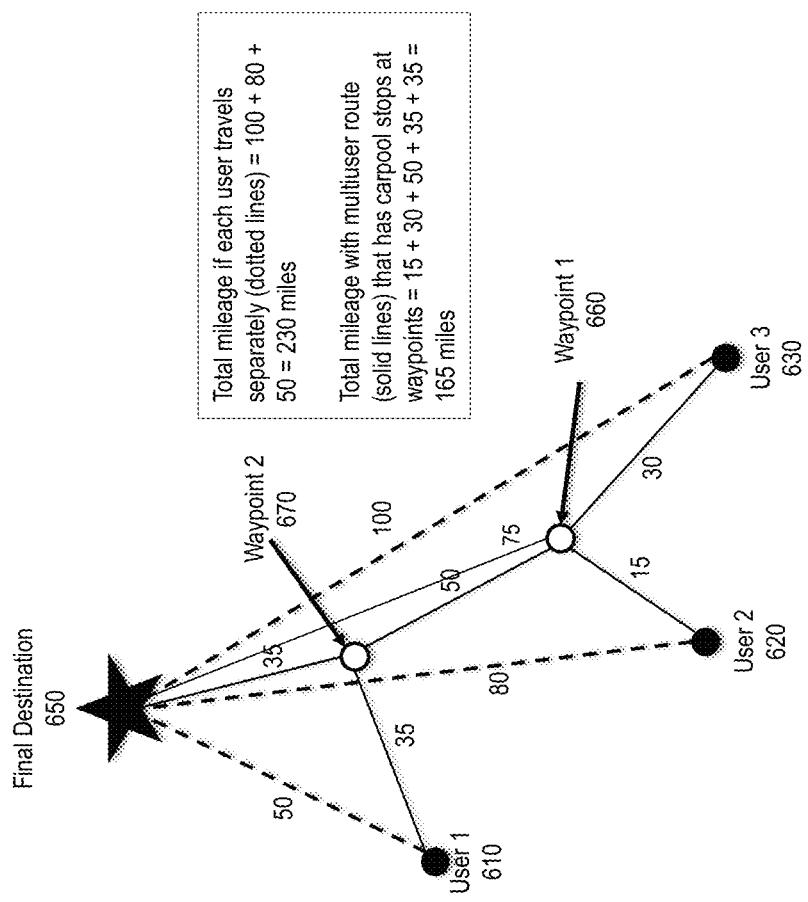
FIG. 6 depicts an example multiuser route according to one or more embodiments.

FIG. 5 depicts a flowchart of an example method for route planning for multiple users traveling to the same destination according to one or more embodiments. The method is implemented by one or more of the components of the navigation system 100. The method is described with reference to FIG. 6 that provides a depiction of three users, a first user 610, a second user 620, and a third user 630, using the navigation system 100 to generate a multiuser route (solid lines) to travel to a common destination 650. The multiuser route that is generated includes two waypoints, a first waypoint 660, and a second waypoint 670. The three users 610, 620, and 630, are depicted at corresponding departure points. Further, FIG. 6 depicts route segments between the various points along with example lengths of the route segments. In one or more examples, the lengths may represent the distances between a pair of points, for example in miles, kilometers, or any other unit. In one or more examples, the lengths may represent the time required to travel between a pair of points, for example in minutes, or any other unit. It should be noted that route segments between various points are depicted using straight lines, which is for depiction only, and that the route segments may include one or more roads, one or more turns, etc. Further, it should be noted that the scenario depicted in FIG. 6 is just an example and that the navigation system 100 may be used in other example scenarios, with a different number of users, different route segments, and other attributes than those depicted in FIG. 6.

Referring to FIG. 5, the method includes sending an invitation by the first user 610 to the other users 620, 630, to initiate generation of the multiuser route, at 510. The invitation is sent from a first navigation device 110 to other navigation devices 110 associated with the respective users. In one or more examples, the invitation is sent via the multiuser route generator, for example, using usernames, or other identifiers associated with the users 610, 620, and 630. Alternatively, or in addition, the invitation may include a link to a user-interface that facilitates the users 610, 620, 630 to accept/reject the invitation and enter input data in case of acceptance, at 515.

The method further includes the one of the users 610, 620, 630 inputting the common destination 650 to the multiuser route generator, at 520. The destination 650 is input as geographic coordinates, landmark, street/postal address, selecting a location on an interactive map, or in any other manner. The method further includes receiving a departure location for the first user 610, at 525. In one or more examples, the departure location is obtained by the multiuser route generator 130 automatically via the navigation device 110 of the first user 610. Alternatively, or in addition, the first user 610 may enter the departure location, as described above. For example, the departure location of the first user 610 when traveling to the destination 650 may be different than the present location of the first user 610. The method further includes receiving departure locations for the other users that accepted the invitation, at 530. For the ongoing example, consider that both, the second user 620, and the third user 630, accepted the invitation.

The method further includes checking if any of the users 610, 620, and 630, is inputting a waypoint to be included in the multiuser route, at 535. If a waypoint is not added, the multiuser route generator 130 searches the data repository 170 for waypoints that are along the one or more route segments between the departure locations of the users 610, 620, 630 and the destination 650, at 550. Searching waypoints in this manner is performed by filtering only for locations that can be used as waypoints using the one or more identifiers in the data repository 170. The search may use an algorithm to determine the waypoints as points of interest along the route segments, the algorithm being accessible via an API from the data repository or from any other mapping service. In the ongoing examples, consider that the search results in the two waypoints 660 and 670.

The method further includes analyzing the selected waypoints along the route segments to determine the multiuser route, at 555. For example, if the multiuser route is to be optimized to reduce the travel distance, the analysis includes determining a sum of the travel distances with and without using the multiuser route. The sum of travel distances, in the ongoing example from FIG. 6, without using the multiuser route, i.e. with the users traveling independently, the total distance is 230 miles (dotted lines). The analysis includes determining the sum of travel distances for each of the individual users.

The multiuser route generator 130 generates a first multiuser route that includes the first waypoint 660. If the second user 620 and the third user 630 meet at the first waypoint 660, and carpool further to the destination 650, the total travel distance reduces to 170 (User1:50+User2:15+User3:30+<User2&3>:75). Using the first multiuser route, with only the first waypoint 660, optimizes the travel distance compared to the three users traveling independently. The analysis further includes generating additional multiuser routes in this manner with different combinations of the selected waypoints.

For further illustration consider the multiuser route that uses the combination of the two waypoints 660 and 670. Here, the second user 620 and third user 630 meet and carpool at the first waypoint 660, and further, the first user 610 meets them at the second waypoint 670 and the three users carpool further to the destination 650. In this case, the total distance traveled reduces to 165 miles, which is further optimized compared to the first multiuser route.

The two examples above are described to optimize the travel distance as the travel parameter, and the route segment attributes considered are distances. However, it should be noted that in other examples of the travel parameter that is optimized may be used such as the travel time along the route segments, which is to be optimized and is analyzed in the same manner as described herein. Further yet, in one or more examples, the users may optimize fuel consumption as the travel parameter, where the users provide their respective vehicle gas mileage or vehicle models to determine gas mileage from the data repository 170 (or another data source). For example, the travel distance is minimized for the vehicles with the higher miles per gallon (MPG) ratings for gas mileage. It should be noted that any other travel parameter may be chosen to be optimized in this manner.

The method further includes outputting the determined multiuser route that optimizes the travel parameter for the multiple users over each user traveling independently, at 560.

Further, the method includes querying the users for entering any additional waypoints to revise the output multiuser route, at 565. If no additional waypoints are to be added, the method includes using the generated multiuser route that is presently output as the optimized multiuser route for the multiple users, at 570. In one or more examples, outputting the optimized multiuser route for the multiple users includes composing the optimized multiuser route using multiuser routes from recursive instances of the analysis (described further FIG. 8), at 572. Each analysis instance uses different subsets of the selected waypoints and may combine two or more users to create a new user, and further optimizing the travel parameter.

Outputting the optimized multiuser route further includes computing and providing scheduled departure times for the users, at 574. For example, the method includes checking present and predicted traffic conditions to determine an estimated time for the users to reach their designated waypoints from their respective departure points. Accordingly, to have two users who are designated to carpool at a waypoint to reach the waypoint at substantially the same time, the multiuser route generator 130 determines departure times for the users. In one or more examples, determining the departure times may further use present weather conditions, and/or other factors to estimate the travel time for the users to the waypoints.

Further, in one or more examples, the multiuser route generator monitors the locations of the users continuously and provides the corresponding location and estimated time of arrival (ETA) updates to the users, at 576. For example, the locations of the multiple users are visually depicted on a rendering of a map with the route segments of the multiuser route highlighted via a UI on the navigation devices 110. The ETA of the users may be displayed in conjunction, or in response to user interaction with the user locations.

Figure 7:
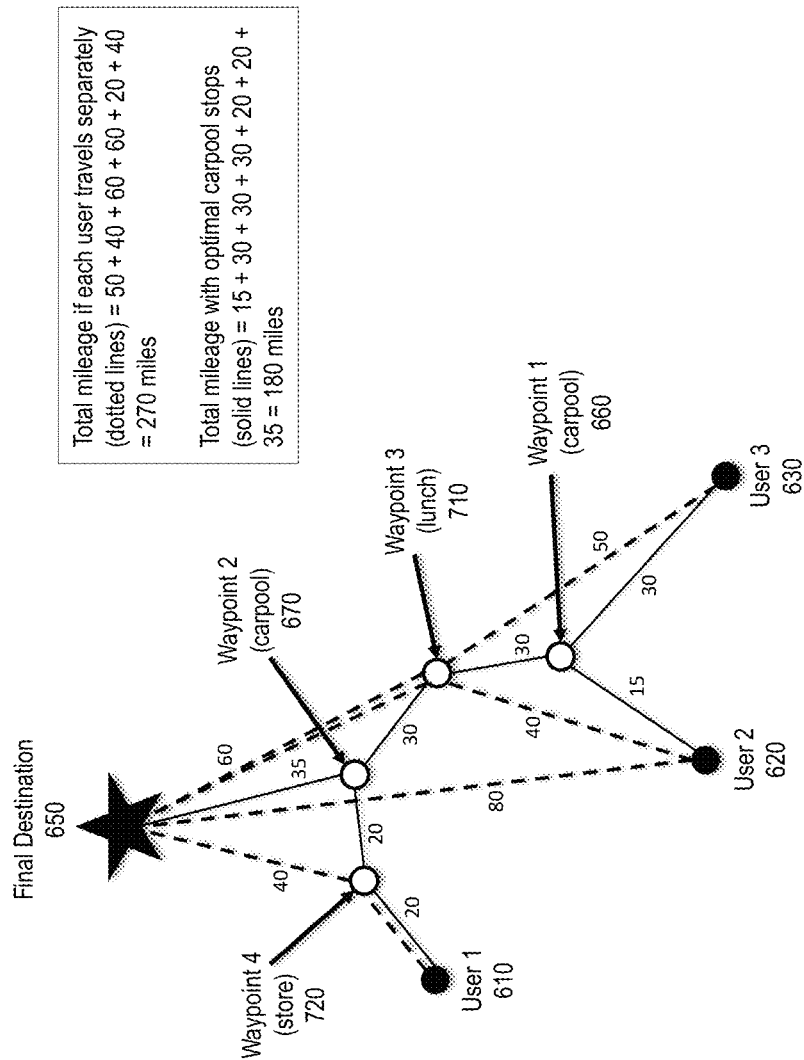
FIG. 7 depicts an example multiuser route according to one or more embodiments.

Referring back to the flowchart, if one or more of the users enter one or more personal waypoints, at 540. The waypoints may be added by inputting address, geographic coordinates, selecting location via a map or list, or any other manner. FIG. 7 provides a depiction of the ongoing example scenario with two more waypoints 710, 720 that are added by the one or more users. For example, the example scenario may depict a case where the three users are carpooling to a football game (destination 650), second user 620 and third user 630 would like to meet for lunch at waypoint-3 710 (before the game), and the first user 610 wants to stop at a store at waypoint-4 720 to buy a jersey to wear to the game and doesn't want to meet for lunch. The method includes adding, via the navigation devices 110, the waypoints 710 and 720 for consideration when generating the multiuser route.

The method includes using the added waypoints as meeting points for carpooling, at 545. To use the added waypoints as meeting points, the method recursively uses each of the added waypoints as a destination (intermediately) and performs the analysis of the one or more combinations of the waypoints to determine the optimized multiuser route.

Figure 8:
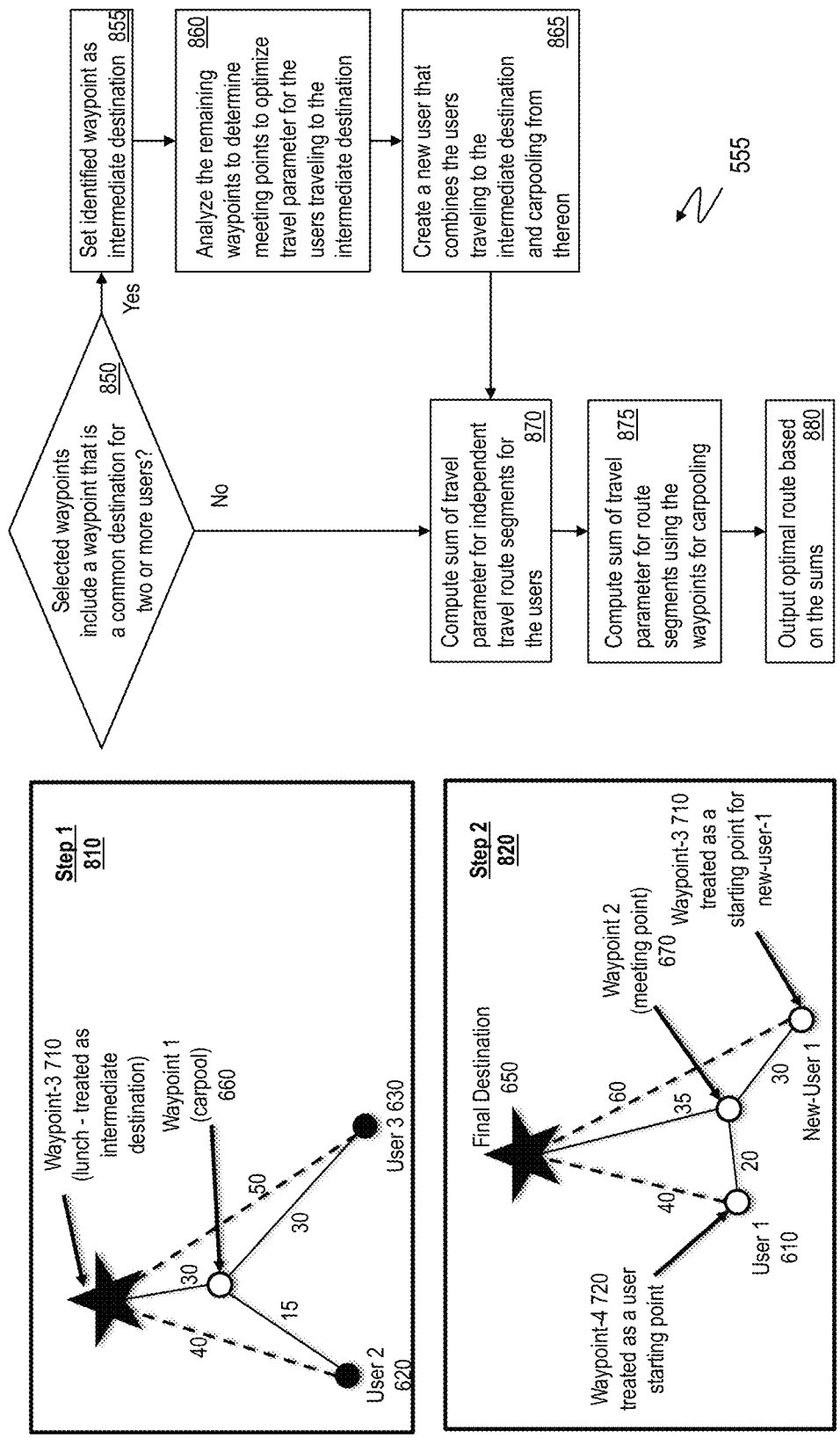
FIG. 8 depicts a flowchart of an example method for analyzing a set of one or more waypoints to determine an optimized multiuser route according to one or more embodiments.

FIG. 8 depicts a flowchart of an example method for analyzing a set of one or more waypoints to determine an optimized multiuser route according to one or more embodiments. The method described further corresponds to one or more analysis related operations introduced in the flowchart of FIG. 5 (for example, between 545 to 565). Further, FIG. 8 visually depicts steps 810 and 820 when analyzing the waypoints for generating the optimized multiuser route in the ongoing example scenario with users 610, 620, and 630, traveling to the common final destination 650.

The waypoints that are analyzed include the waypoints that are searched and selected from the data repository 170 and the personal waypoints that are added by the users (FIG. 5, 540). In one or more examples, the waypoints that are input by the users are added into the data repository 170 for future selection. The analysis method is performed recursively, i.e., an instance of execution of the method may initiate one or more instances (child instance) of execution of the same method, with different inputs respectively. The output from a child instance is then used for completing execution of the instance (parent instance) that initiated the child instance.

Referring to the flowchart in FIG. 8, the method includes checking if any of the selected waypoints that are being analyzed by the method instance include a waypoint that is a common destination for two or more users, at 850. For example, in the ongoing scenario, the waypoint-3 710 is a common destination for lunch for user-2 620 and user-3 630. If such a waypoint exists, the method includes setting the waypoint as an intermediate destination for performing the analysis on the remaining waypoints from the selected set of waypoints, at 855.

The method further includes analyzing the remaining waypoints to determine meeting points to optimize travel parameters for the users traveling to the intermediate destination, at 860. As described herein the travel parameter may be the travel distance, the travel duration, or any other parameter being analyzed and optimized. This analysis is a child instance of the analysis method that is being described, with the selected waypoints being treated similar to a final destination (in this case waypoint-3 710). The method includes creating a new user that combines the users traveling to the intermediate destination and carpooling from thereon (described in detail further), at 865. The analysis includes computing a sum of travel parameters associated with the one or more route segments and determining the optimal route based on the sum, as described further (see 870-875). The analysis outputs the optimal multiuser route for the users to reach the intermediate destination, at 880.

The step 1 810 visually depicts using the waypoint-3 710 that was selected for lunch as the intermediate destination and analyzing the route segments from the departure points of the user-2 620 and the user-3 630 and the remaining waypoints. As is seen from the step 1 810, the multiuser route with the user-2 620 and the user-3 630 meeting and carpooling at the first waypoint 660 optimizes the route (sum=75 miles) compared to the two users meeting directly at the waypoint 3 710 (sum=90 miles).

The method, upon receiving the output from the analysis step, further includes creating a new user that combines the users traveling to the intermediate destination and carpooling from thereon, at 865. The intermediate destination is set as the starting point for the new-user-1. In this case, user-2 620 and user-3 630 are treated as a new-user-1. The waypoint-3 710 is the intermediate destination for user-2 620 and user-3 630 and is set as the starting point for the new-user-1 (see Step 2).

The method further includes computing the sum of the travel parameters for travel route segments for the users to reach the destination point independently, at 870. The method further includes computing a sum of travel parameter for route segments using the waypoints for carpooling and combining the carpool users into new users (as described earlier), at 875. The method further includes computing the sum of the travel parameters for route segments using the waypoints for carpooling, at 875. In one or more examples, multiple combinations of the waypoints for carpooling are determined, and the sums for each respective combination is computed. The method further includes outputting the optimal route based on the sums computed, at 880. For example, the route with the minimum sum is the optimal route. The travel parameter being optimized may be the travel distance, travel duration or the like.

Referring back to 850, if the waypoints being analyzed by the method do not include an intermediate destination, the waypoints are analyzed to determine a multiuser route as described above using operations 870-880.

In the ongoing scenario, the optimized route for user-1 610 and the new-user-1 is depicted in step 2 820 (solid lines), where the users meet at the waypoint-2 670 for carpooling and travel together from thereon. The sum of the travel parameters for the multiuser route is 85 miles compared to a sum of the independent travel being 100 miles. The final output of the multiuser route includes the optimized multiuser routes identified for the one or more intermediate destination points during the recursion.

The method can thus be described, in other words, to take starting positions of at least two users and at least one destination for all or a subset said users as input and calculate an optimal route with meetup waypoints such that a travel parameter between multiple vehicles is minimized. The travel parameter may be travel distance, travel duration, and the like.

The technical solutions described herein facilitate determining an optimal multiuser route for multiple users to identify one or more waypoints to meet at, and travel together from thereon, and by reducing a number of vehicles being used, a total number of miles among the multiple users. In one or more examples, a database of meetup waypoint locations is used to perform the route calculation. The database may be user-generated, i.e. the one or more users may add waypoints to be used for the route calculation to the database. In one or more examples, a navigation application, such as, a navigation device, a mobile device, a desktop computer, a tablet computer, or any other navigation device can be used to invite other users to an optimized route planning service that determines the optimal multiuser route.

In one or more examples, the users geographic location is automatically detected and used for the multiuser route generation. In one or more examples, the location of a user is detected upon the user accepting an invitation to join the multiuser route.

The technical solutions described herein use a recursive process of treating one or more waypoints added by the users as intermediate destinations, then combining all the data into a full optimized multiuser route.

Further yet, the technical solutions described herein facilitate providing the users with a time to leave based on the locations of other users along the multi-route, taking into consideration factors such as traffic, weather conditions, and the like.

Further yet, in one or more examples, the technical solutions facilitate the users to optimize fuel consumption as the travel parameter, where the users provide their respective vehicle gas mileage or vehicle models to determine gas mileage from the data repository 170 (or another data source). For example, the travel distance is minimized for the vehicles with the higher miles per gallon (MPG) ratings for gas mileage. Alternatively, or in addition, the travel parameter to be optimized is the longest path for at least one user, for example, to be minimized.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the technical features herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for determining a route for multiple users traveling to a common destination, the method comprising:

sending, by a first navigation device from a plurality of navigation devices associated respectively with a plurality of users, an invitation to other navigation devices from the plurality of navigation devices, the invitation being for joining a multiuser route to travel to said common destination, wherein each of the other navigation devices associated respectively with a plurality of users is configured to send invitations to the other navigation devices;

in response to at least one of the other navigation devices accepting the invitation, generating, by a multiuser route generator, the multiuser route, the multiuser route comprising one or more waypoints, a waypoint being a location to which at least two of the plurality of users travel independently or jointly, and travel to the common destination jointly thereafter, wherein generating the multiuser route comprises:

receiving departure locations of the plurality of users respectively;

receiving one or more potential waypoints from the plurality of users to be added to a predetermined list of waypoints, wherein the predetermined list of waypoints includes one or more locations for the user to leave a parked vehicle, wherein each waypoint is associated with an attribute that comprises at least one of a parking lot, mall, or shopping center to facilitate parking one or more vehicles for at least a predetermined duration; and determining, from the list of waypoints, a first waypoint wherein a first total of travel parameters associated with a first user and a second user, both from the plurality of users, traveling from their respective departure points to the first waypoint independently and jointly to the common destination thereafter is lesser than a second total of travel parameters associated with the first user and the second user traveling from their respective departure points to the common destination independently;

adding the first waypoint as an intermediate destination for the first user and the second user;

considering the first user and the second user together, as a combined new-user with the first waypoint as the departure point of the combined new-user;

determining, from the list of waypoints, a second waypoint, wherein a third total of travel parameters associated with the combined new-user and a third user from the plurality of users, both, traveling from their respective departure points to the second waypoint independently and jointly to the common destination thereafter is lesser than a fourth total of travel parameters associated with the combined new-user and the third user traveling from their respective departure points to the common destination independently, wherein the travel parameter is based on a miles per gallon rating for gas mileage of a vehicle that would perform the traveling;

adding the second waypoint as another intermediate destination for the first user, the second user, and the third user, wherein determining, from the list of waypoints, a first and second waypoint further comprises searching for waypoints between the departure points for a pool of the first user, the second user, and the third user and the common destination;

determining navigation routes for the first user, the second user, and the third user, from their respective departure locations to one or more intermediate destinations added for each respective user, and to the common destination thereafter wherein traveling the navigation routes minimize a distance traveled independently-for the first user, the second user, or the third user based on a miles per gallon rating for gas mileage of a vehicle corresponding to the respective user; and sending, by the multiuser route generator, the multiuser route to navigation devices of the respective users, the navigation devices navigating the respective users along the navigation routes for each user.

2. The computer-implemented method of claim 1, wherein determining the multiuser route further comprises:

determining departure times for each of the plurality of users based on estimated travel time for each of the users to arrive at respective waypoints associated with each of the users from their respective departure locations, wherein the departure times are determined for an estimated arrival time of the users at the waypoints to be the same.

3. A system comprising:

a multiuser route generator processor configured to determine a multiuser route for multiple users traveling to a common destination, wherein the multiuser route generator processor is configured to perform:

sending an invitation to a plurality of navigation devices, the invitation being for joining said multiuser route to travel to said common destination, wherein each of the plurality of navigation devices is configured to send invitations to a plurality of other navigation devices;

in response to at least one of the navigation devices accepting the invitation, generating the multiuser route, the multiuser route comprising one or more waypoints, a waypoint being a location to which at least two of the plurality of users travel independently or jointly, and travel to the common destination jointly thereafter, wherein generating the multiuser route comprises:

receiving departure locations of the plurality of users respectively;

receiving one or more potential waypoints from the plurality of users to be added to a predetermined list of waypoints, wherein the predetermined list of waypoints includes one or more locations for the user to leave a parked vehicle, wherein each waypoint is associated with an attribute that comprises at least one of a parking lot, mall, or shopping center to facilitate parking one or more vehicles for at least a predetermined duration; and determining, from the list of waypoints, a first waypoint, wherein a first total of travel parameters associated with a first user and a second user, both from the plurality of users, traveling from their respective departure points to the first waypoint independently and jointly to the common destination thereafter is lesser than a second total of travel parameters associated with the first user and the second user traveling from their respective departure points to the common destination independently;

adding the first waypoint as an intermediate destination for the first user and the second user;

considering the first user and the second user together, as a combined new-user with the first waypoint as the departure point of the combined new-user;

determining, from the list of waypoints, a second waypoint, wherein a third total of travel parameters associated with the combined new-user and a third user from the plurality of users, both, traveling from their respective departure points to the second waypoint independently and jointly to the common destination thereafter is lesser than a fourth total of travel parameters associated with the combined new-user and the third user traveling from their respective departure points to the common destination independently, wherein the travel parameter is based on a miles per gallon rating for gas mileage of a vehicle that would perform the traveling;

adding the second waypoint as another intermediate destination for the first user, the second user, and the third user, wherein determining, from the list of waypoints, a first and second waypoint further comprises searching for waypoints between the departure points for a pool of the first user, the second user, and the third user and the common destination;

determining navigation routes for the first user, the second user, and the third user, from their respective departure locations to one or more intermediate destinations added for each respective user, and to the common destination thereafter, wherein traveling the navigation routes minimize a distance traveled independently for the first user, the second user, or the third user based on a miles per gallon rating for gas mileage of a vehicle corresponding to the respective user; and sending the multiuser route to navigation devices of the respective users, the navigation devices navigating the respective users along the navigation routes for each user.

4. The system of claim 3, wherein the system further comprises:

the navigation devices of the respective users comprising a first navigation device configured to:

initiate the determination of the multiuser route in response to at least one of the other navigation devices accepting the invitation.

5. The system of claim 3, wherein determining the multiuser route further comprises:
determining departure times for each of the plurality of users based on estimated travel time for each of the users to arrive at respective waypoints associated with each of the users from their respective departure locations, wherein the departure times are determined for an estimated arrival time of the users at the waypoints to be the same.

6. A computer program product comprising a computer readable storage medium having program instructions embodied therewith, the program instructions executable by a processing circuit to cause the processing circuit to determine a multiuser route for multiple users traveling to a common destination, the route determination comprising:
sending an invitation to a plurality of navigation devices, the invitation being for joining said multiuser route to travel to said common destination, wherein each of the plurality of navigation devices is configured to send invitations to the to the plurality of navigation devices;
in response to at least one of the navigation devices accepting the invitation, generating the multiuser route, the multiuser route comprising one or more waypoints, a waypoint being a location to which at least two of the plurality of users travel independently or jointly, and travel to the common destination jointly thereafter, wherein generating the multiuser route comprises:
receiving departure locations of the plurality of users respectively;
receiving one or more potential waypoints from the plurality of users to be added to a predetermined list of waypoints, wherein the predetermined list of waypoints includes one or more locations for the user to leave a parked vehicle, wherein each waypoint is associated with an attribute that comprises at least one of a parking lot, mall, or shopping center to facilitate parking one or more vehicles for at least a predetermined duration; and
determining, from the list of waypoints, a first waypoint, wherein a first total of travel parameters associated with a first user and a second user, both from the plurality of users, traveling from their respective departure points to the first waypoint independently and jointly to the common destination thereafter is lesser than a second total of travel parameters associated with the first user and the second user traveling from their respective departure points to the common destination independently;
adding the first waypoint as an intermediate destination for the first user and the second user;
considering the first user and the second user together, as a combined new-user with the first waypoint as the departure point of the combined new-user;
determining, from the list of waypoints, a second waypoint, wherein a third total of travel parameters associated with the combined new-user and a third user from the plurality of users, both, traveling from their respective departure points to the second waypoint independently and jointly to the common destination thereafter is lesser than a fourth total of travel parameters associated with the combined new-user and the third user traveling from their respective departure points to the common destination independently, wherein the travel parameter is based on a miles per gallon rating for gas mileage of a vehicle that would perform the traveling;
adding the second waypoint as another intermediate destination for the first user, the second user, and the third user,
wherein determining, from the list of waypoints, a first and second waypoint further comprises searching for waypoints between the departure points for a pool of the first user, the second user, and the third user and the common destination;
determining navigation routes for the first user, the second user, and the third user, from their respective departure locations to one or more intermediate destinations added for each respective user, and to the common destination thereafter, wherein traveling the navigation routes minimize a distance traveled independently for the first user, the second user, or the third user based on a miles per gallon rating for gas mileage of a vehicle corresponding to the respective user; and
sending the multiuser route to navigation devices of the respective users, the navigation devices navigating the respective users along the navigation routes for each user.

7. The computer program product of claim 6, wherein determining the multiuser route further comprises:
determining departure times for each of the plurality of users based on estimated travel time for each of the users to arrive at respective waypoints associated with each of the users from their respective departure locations, wherein the departure times are determined for an estimated arrival time of the users at the waypoints to be the same.

* * * * *